UNITED STATES PATENT OFFICE.

JOHN A. WRIGHT, OF KEENE, NEW HAMPSHIRE.

COMPOUND FOR ABSORBING OILS FOR BURNING AND ILLUMINATING PURPOSES.

SPECIFICATION forming part of Letters Patent No. 255,230, dated March 21, 1882.

Application filed February 3, 1882. (Specimens.)

*To all whom it may concern:*

Be it known that I, JOHN A. WRIGHT, of Keene, in the county of Cheshire and State of New Hampshire, have invented a new and useful Compound for Absorbing Oils for Burning and Illuminating Purposes; and I do hereby declare that the following is a full and exact description of the same.

In the manufacture of this compound I use the following materials, and in the proportions named, but the proportions of either ingredient may be varied without prejudice to this invention: Infusorial earth, one hundred pounds; clay, one hundred and fifty pounds; asbestus, twenty-five pounds.

The method of preparing this compound is as follows: The infusorial earth and clay are each reduced to a fine powder and the asbestus to a state resembling lint or paper-pulp. The clay is then put into a trough or other suitable receptacle and sufficient water added to thoroughly saturate it. I find three hundred parts of same will suffice for these proportions. The mass is then agitated until it is reduced to a state of thick cream or plastic mass; then is added the infusorial earth in small quantities, agitating the mass until it is absorbed or mixed into the semi-liquid plastic clay; then the asbestus is added and worked into the mass, as hair is worked into mortar. The mass is then agitated until all the ingredients are intimately mixed, and, if necessary, more infusorial earth may be added until it becomes of the consistence of ordinary mortar, or so that it can be readily molded. The compound may then be molded into any desired shape in plaster-of-paris molds. When sufficiently hardened the molds are removed and the articles burned for about eight hours in a kiln, the same as pottery-ware is burned. The result is a soft porous substance, which can be sawed into blocks of any desired shape for use as fire-kindlings, torches, fuel, lamp-wicks, &c.

This compound will absorb about one-quarter ounce of coal-oil per cubic inch; hence its great value as an absorbent for oils destined to be burned for fuel or illuminating purposes.

The materials composing this compound being indestructible by fire or heat, articles made from it may be filled with oil, burned out, and refilled an indefinite number of times, which makes them not only very valuable, but safe, as the oil does not escape by evaporation or otherwise, and thereby cause accidents by inflammation.

The oil-retaining properties of this compound are such that articles made from it can be filled with oil and laid aside to be used at pleasure, as the oil will remain until burned out.

When used as fuel, the blocks may be removed from the fire, refilled at once by dipping them in oil, and be ready for use again without danger.

When used for lamp-wicks, the compound is cut into proper shape to take the place of an ordinary wick.

Having thus described my invention, I claim—

A compound made of infusorial earth, clay and asbestus, in the manner and proportion substantially as herein described, and for th purposes set forth.

This specification signed and witnessed thi 1st day of February, 1882.

JOHN A. WRIGHT.

Witnesses:
HIRAM BLAKE,
CHARLES H. STILES.